Feb. 10, 1948. G. H. FRITZINGER Re. 22,972
DEVICE FOR AND METHODS OF USING ADHESIVE TAPE
Original Filed Aug. 29, 1944
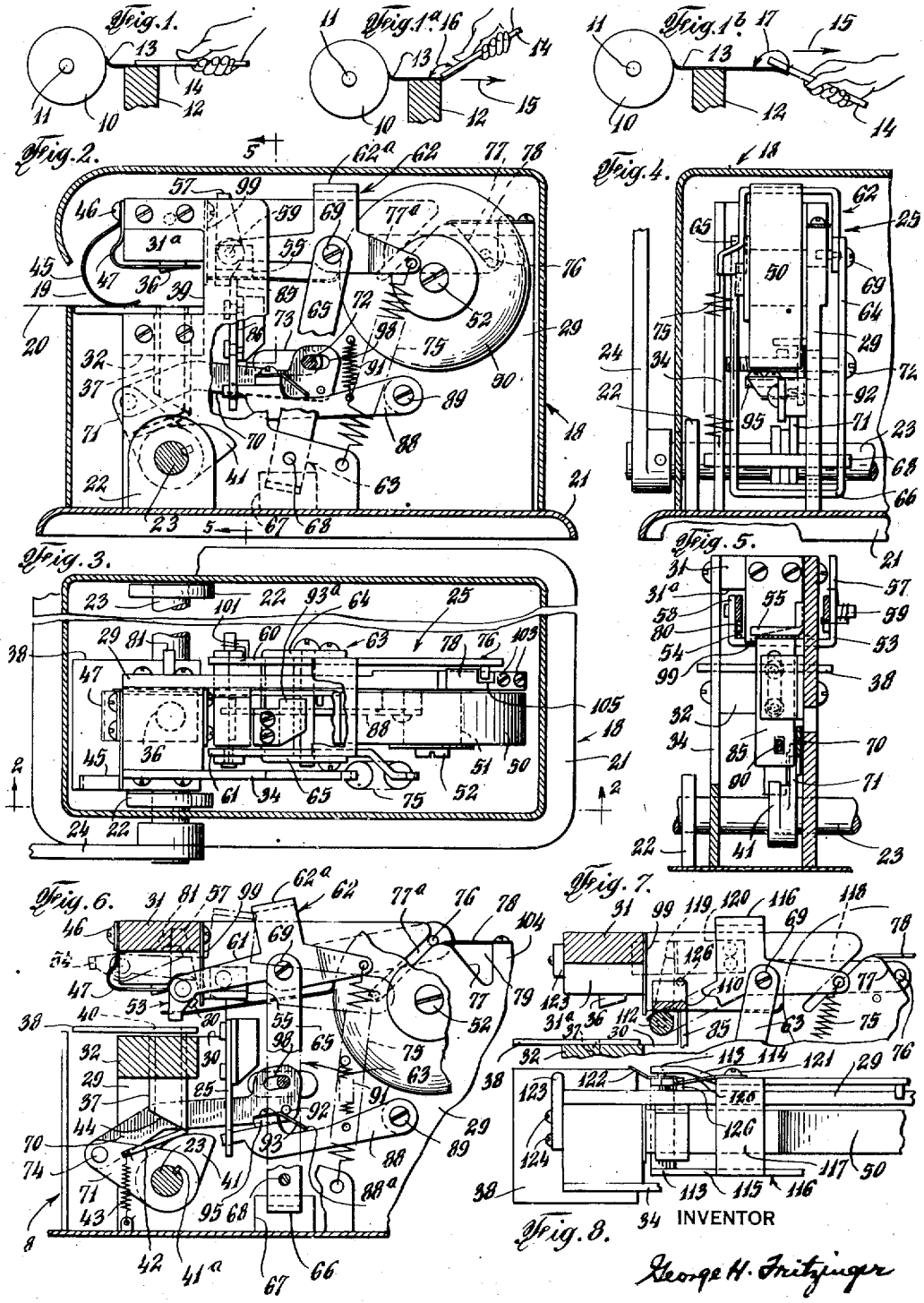
INVENTOR
George H. Fritzinger Reissued Feb. 10, 1948 Re. 22,972

UNITED STATES PATENT OFFICE 22,972

DEVICE FOR AND METHOD OF USING ADHESIVE TAPE

George H. Fritzinger, West Orange, N. J., assignor of one-half to Harold G. Kendall, Brooklyn, N. Y.

Original No. 2,401,298, dated June 4, 1946, Serial No. 551,769, August 29, 1944. Application for reissue May 19, 1947, Serial No. 748,879

41 Claims. (Cl. 164—117)

This invention relates to novel and improved mechanisms for dispensing tape and to novel and improved combinations of mechanisms for dispensing and applying strips of adhesive tape to objects. By way of example, the invention has particularly useful application for dispensing predetermined lengths of tape for use as desired, and for dispensing and applying strips of adhesive tape to sheets for reenforcing purposes, such as to paper sheets, shoe vamps, cards, tags, envelopes or other relatively thin objects.

In dispensing tape by my invention the tape is held through the medium of a pressure-sensitive adhesive surface such as the adhesive surface of non-drying adhesive tape known as "Scotch" tape. The invention has particular utility and is herein particularly described in connection with such non-drying (i. e., pressure-sensitive) adhesive tape, but may have application also to other adhesive tapes as well as to non-adhesive tapes.

The machine herein particularly shown and described for illustrating my invention is one for reenforcing and punching sheets such as paper sheets for loose-leaf binders, and is especially suited for use in offices, stores, bureaus, or other places where loose-leaf records are kept.

It is a particular object of my invention to provide new methods of dispensing or feeding tape which are more simple, positive and dependable than the methods heretofore used, and it is a further object to provide novel and simple mechanisms for carrying out these methods.

The principle of feeding tape according to my invention lies in the discovery that a non-drying adhesive tape will adhere tenaciously against being pulled free from a smooth rigid surface, to which the tape has been applied, so long as the adhesive side of the portion of tape contacting the surface is maintained substantially at an angle of 180 degrees, or preferably less, from the adhesive side of the length of tape under tension which extends from the surface, this angle being hereinafter referred to as the "feed angle." In other words, by having a feed angle of less than 180 degrees, there is obtained a strong tenacious grip of the surface of the tape. On the other hand, when this feed angle is made substantially greater than 180 degrees a slight pull on the extending length of tape will readily strip the tape from the surface, leaving the surface clean of any adhesive or gum of the tape and the adhesive of the tape free from damage.

In utilizing this principle for releasably holding and dispensing "Scotch" tape, there is used a smooth non-adhesive surface of a rigid material such as metal or plastic, but in dispensing other tapes the invention contemplates providing this surface with a pressure-sensitive adhesive material.

My invention further contemplates feeding non-drying adhesive tape by means of a feed member having either a flat or convex tape-contacting surface, and it also contemplates moving such surface in translation and/or rotation for pulling the tape from a tape roll and in both translation and rotation relative to the roll for stripping the tape from the surface.

It is another object of my invention to provide a mechanism for reciprocating such a feed member whereby to pull successive lengths of tape from a tape roll by the use of the aforestated principle.

It is a further object to turn the feed member relative to the extending tape at the end of each feed stroke so as to strip the tape free from the feed member in accordance with the aforestated principle, and it is a further object to hold the tape stationary at the end of each feed stroke to assure positively that the feed member will be freed from the tape and that a predetermined length of tape will be fed from the roll.

In feeding and cutting successive lengths of non-drying adhesive tape from a tape supply I provide means for holding the end portion of each succeeding length of tape during the return stroke of the feed member. Preferably, I provide a releasable holding means for this purpose, and it is an object of my invention to render this holding means ineffective at the start of each feed stroke of the feed member and to render it effective for positively holding the tape stationary at the end of each such feed stroke.

It is another object to position this holding means just back of the initial position of the feed member and to release the holding means from the tape at the start of each feed stroke while the adjacent free end portion of the tape is supported and held by the feed member.

It is another object when using a feed member having a flat tape-contacting surface to utilize the resisting feed force of the tape at the start of each feed stroke for turning the feed member to a feed angle of less than 180 degrees.

It is another object when using a feed member having a convex tape-contacting surface to utilize the resisting feed force of the tape for turning the feed member to a feed angle greater than 180 degrees at the end of each feed stroke.

It is a further object to move such curved feed member in translation while holding it restrained against rotation during the effective portion of each feed stroke and to move it further in translation without rotational restraint at the end of each feed stroke.

It is a further object to feed tape to a die mechanism of a tape-working machine by a pulling operation, and it is a further object to provide means for so feeding the tape, which clears the die mechanism and does not obstruct the closing and opening of the die members.

These and other objects and features of my invention will more fully appear from the following description and the appended claims.

In the description of my invention, reference is had to the accompanying drawing, of which:

Figures 1, 1*a* and 1*b* illustrate one method for feeding non-drying adhesive tape by hand according to the aforestated principle of my invention:

Figure 2 is a vertical sectional view of a machine for punching and reenforcing sheets in which one embodiment of tape-feeding means of my invention is incorporated, this view being taken on the line 2—2 of Figure 3 with parts broken away for the better illustration of the machine:

Figure 3 is a fractional plan view of this machine partly broken away and showing the housing in horizontal section;

Figure 4 is a fractional rear elevational view of this machine showing the housing in vertical section;

Figure 5 is a fractional vertical sectional view taken substantially on the line 5—5 of Figure 2;

Figure 6 is a fractional view similar to Figure 2 but illustrating the positioning of the parts of the machine in different stages of operation thereof;

Figure 7 is a fractional vertical sectional view of the type of machine of Figure 2 in which a second embodiment of feeding mechanism according to my invention is incorporated; and Figure 8 is a fractional plan view of the machine of Figure 7.

In Figures 1, 1*a* and 1*b* I illustrate one method of pulling a predetermined length of tape from a tape roll by hand in accordance with the aforestated principle of my invention. The tape roll is here referred to as 10 and is considered as being pivotally supported at 11. Beside the roll is a stationary table 12 on which lies a free end portion 13 of the tape with the adhesive side thereof facing upwardly. To this free end portion of the tape there is applied a surface portion of a smooth rigid bar 14, say the back smooth side of a small steel ruler, as indicated in Figure 1. If the bar is then moved from the roll along the arrow 15 as indicated in Figure 1*a*, while being held tilted to its path of movement so that the adhesive side of the tape contacting the bar is at a feed angle 16 (as hereinbefore defined on page 2) of less than 180 degrees from the adhesive side of the length of tape extending from the bar to the roll, the tape adheres tenaciously to the bar and is pulled positively from the roll. In fact, if a length of ¼" of tape is applied to the bar and the bar is tilted by 20 degrees or more from its path of movement the tape will adhere so tenaciously to the bar that with increasing tensioning the tape will oft times tear before it breaks loose from the bar. On the other hand, if the bar is inclined in a reverse direction to its path of movement so that the feed angle 17 is greater than 180 degrees as shown in Figure 1*b*, then as the bar is moved further from the roll the tape is stripped readily from the bar by the resisting feed force of the tape supplied by the adherence of the tape to the roll, and the surface of the bar is left clean of any gum or adhesive of the tape. Should, however, the tape be pulled loose from the bar at a feed angle of 180 degrees or less, some gum of the tape may remain on the bar, but upon reapplying the bar to the tape and stripping the tape therefrom at a feed angle greater than 180 degrees in the manner indicated in Figure 1*b*, the tape picks up the gum and leaves the surface of the bar again clean.

In the machine shown in Figures 2 through 6 there is employed a feed member having a flat tape-contacting surface. This machine has a housing 18, made for example of sheet metal stock, which has a narrow opening 19 at the front along the width thereof for receiving a sheet to be reenforced and punched, the sheet being indicated by dash dot lines and referred to as 20. Secured to the base 21 of the machine at the left and right sides thereof is a pair of standards 22, and journalled in these standards is a rod 23 which extends throughout the width of the machine and through the right wall of the housing thereof. Secured to the right end of this rod is a lever 24 (fractionally shown) which is to be actuated by hand for operating the machine. Coupled to the rod 23 and slidably adjustable therealong is a punching and reenforcing unit 25, there being only one such unit shown but it being understood that two or more may be provided at spaced intervals along the rod 23. The unit 25 is adapted to receive the sheet 20 by way of the opening 19 of the housing and, with each downward stroke of the lever 24, to feed a length of tape across a border portion of the sheet, cut off the tape from the tape supply, apply the tape to the sheet and punch a hole through the tape and sheet, thus leaving the sheet with a reenforced apertured portion.

The unit 25 has a main vertical frame plate 29 at the left side thereof. This frame plate has a bearing receiving the rod 23 at the front, and rests slidably on the base 21 of the housing at the rear. In line horizontally with the opening 19 of the housing, the plate has a wide slit 30 (see Figure 6) and above and below this slit it has rightwardly extending blocks 31 and 32 held thereto by screws as shown. Secured also by screws to the right sides of these blocks is a vertical plate 34 which depends to the base of the housing; this frame plate also has a bearing receiving rod 23. By the mounting of the frame plates 29 and 34 on the rod 23, the unit 25 is held stable against sidewise rocking, but may be adjusted laterally of the machine as desired.

The blocks 31 and 32 form the framework for a die unit of the punching and shearing type such as is described and claimed in my pending application S. N. 467,616, filed December 2, 1942, and entitled Machines for reenforcing and punching sheets. This die unit has a punch 36 mounted in the upper block 31 and depending below the bottom face thereof. The lower block 32 has an aperture vertically in line with this punch, and slidable in this aperture is a tube 37 to the upper end of which is staked a horizontal plate 38 forming a lower die plate for the die unit. This die plate overlies the lower block 32 and is preferably extended laterally beyond the side frame plates 29 and 34, the die plate passing through the slit 30 of the left side frame plate and through a slit 39 in the right frame plate 34 shown in Figure 2. The die plate has an aperture 40 vertically in line with the punch and communicating with the tube 37, and is movable vertically to close and open the die unit, the punch 36 being engaged by the aperture 40 when the die unit is closed. For so closing the die unit there is between the side frame plates a cam 41 which is splined to the shaft 23. When the lever 24 is moved down this cam engages a downwardly inclined lug 42 at the bottom of the tube 37 and moves the die plate upwardly; and when the lever is moved up the die plate is moved down by a spring 43 connected to the lug 42 as shown in Figure 6.

When the die plate 38 is in lowermost position, it is at the level of the bottom edge of the front opening 19 in the housing. Upon inserting a sheet 20 into the machine, the same is moved across the die plate 38 until it abuts against the back edge of the slit 39 in the right side frame plate 34. Upon next moving the lever 24 down, the sheet is raised by the lower die plate and is punched, the punchings falling down through the tube 37 and out through an opening 44 at the bottom of the tube as shown in Figure 6. In order that the sheet will be held in place on the die plate during operation of the machine, there is provided a curved spring 45 which is held by screws 46 to the front side of the upper block 31. This spring depends downwardly from the block 31 to a position where it just clears the die plate 38 when the latter is in lowermost position. As the die plate is raised the spring bears against the sheet and clamps it to the plate.

Below the upper block 31 and spaced from the bottom face thereof, there is a flat horizontal spring 47 having a front upwardly curved portion held by the screws 46 to the front side of the block 31. This spring has an opening for clearing the punch 36. When the die unit is closed the spring 47 yields to the upward movement of the die plate 38, and as the die unit is opened the spring moves down by its resilience and strips the sheet from the punch.

At the rearward portion of the machine there is a tape roll 50 which is carried rotatably on a post 51 held by a screw 52 to the main frame plate 29. A length of tape from the roll is pulled forwardly into the die unit in response to each downward stroke of the lever 24, with the adhesive side of the tape facing downwardly so that it will be applied to the sheet 20 as the die unit is closed; also, as will hereinafter appear, the length of tape applied to the sheet is cut free from the tape roll as the die unit is closed. The means for so feeding the tape is herein next described.

The feed mechanism is a reciprocable one employing the aforestated principle of feeding tape according to my invention. It is adapted to move a feed member 53 forwardly through the die unit with each downward stroke of the lever 24 and to return the feed member to initial position with each upward stroke of the lever; moreover, it is arranged so as not to obstruct the operation of the die unit. The feed member 53 is adapted to hold to the tape by adhesive contact therewith, and for this purpose it has a smooth flat surface 54 (see Figure 5) which faces upwardly for contacting the adhesive side of the tape extending from the roll 50. In the initial position of the feed member, the same lies directly behind the die unit and below a stationary platform or backing member 55 that is bracketed to the main side frame plate 29. Preferably, the feed member is made in the form of a bail so that it may be pivotally supported on an axis which is spaced from the surface 54, above the level of the tape which contacts the feed member, the advantage of which will hereinafter appear. Thus, the feed member is provided with an upturned leftward arm 57, which lies to the left of the main side frame plate 29, and with a relatively short upturned rightward arm 58 which lies between the side frame plates adjacent the rightward one 34, the feed member passing through a rearward portion of the slit 30 in the main side frame plate as shown in Figure 2. These arms are pivoted at 59 to the forwardly extending arms 60 and 61 of a substantially horizontal bifurcated lever 62, the left arm 60 of this lever being to the left of the main side frame plate 29 (see Fig. 3) and the right arm being to the right thereof near the right side frame plate 34. The arms 60 and 61 are bridged by a cross arm 62a intermediate the length of the lever which overlies the main side frame plate. The lever 62 is supported, for reciprocative front and back movement, by a substantially vertical bifurcated lever 63. This lever has an arm 64 at the left side of the main side frame plate and another arm 65 at the right of this side frame plate near the right frame plate 34, the two arms being joined at the bottom by a cross arm 66 which passes through an opening 67 in the main frame plate. The lower end portion of this lever 63 is pivoted at 68 to the side frame plates, and the upper portion of the arms thereof are pivoted at 69 to the horizontal lever 62, the pivots 69 being to the intermediate portion of the lever 62 so that the tape may be fed into the die unit without the lever 63 interfering with the sheet 20 as will hereinafter appear.

The feed member 53 is reciprocated forwardly and rearwardly as the lever 24 is moved downward and upward. This is accomplished by way of a link 70 that connects the vertical lever 63 to an arm 71 secured to the left side of the aforementioned cam 41, the link being pivoted to a bolt 72 that bridges the arms of the lever 63 and passes through an aperture 73 in the main frame plate 29 and being pivoted to the arm 71 at 74. As the horizontal lever 62 is reciprocated back and forth it is moved angularly about the pivots 69 for reasons hereinafter explained. This angular movement is produced by a tension spring 75 connected to the back end of a right, rearwardly extending arm of the lever 62 and is controlled by the coaction of a pin 76, provided on the back end of a left, rearwardly extending arm of this lever, with a cam 77 and cooperating spring 78 at the upper rearward portion of the main side frame plate.

At the start of each feed stroke the pin 76 lies in a recess 79 behind the cam 77, and under influence of the spring 75 the feed member 53 is biased upwardly against the adhesive side of the free end portion of tape underlying the platform 55. As the lever 24 is moved downwardly the horizontal lever 62 is moved forwardly by the arm 71, link 70 and lever 63; at the same time the pin 76 is slid up the cam 77 to cause the lever 62 to be cammed counterclockwise. As a result, the feed member 53 is moved in translation in a forward-downward direction. As the feed member is so moved it is concurrently being turned in a counterclockwise direction by the resisting feed force of the tape, the counterclockwise direction being established by reason of the feed member having its pivot axis 59 above the level of the tape. Through this turning of the feed member the feed angle is reduced to less than 180 degrees —which is the condition for obtaining a strong adherence or tenacious grip of the tape to the feed member. Typically, this inclining of the feed member may be limited to an angle from 5 to 20 degrees as, for example, by abutment of a lug 80 on the feed member against the side arm 61 of the lever 62 as indicated in Figure 6. Thus, from the foregoing description, it will be apparent that the initial movement of the feed member is essentially one of rotation without effecting any feed of the tape, this rotation being about a center approximately at the back edge of the tape-contacting surface 54.

In the further forward operation of the feed mechanism, however, the feed member is moved in translation and the tape is pulled from the roll 50. But soon the lever 57 impinges against a lateral pin 81 on the left side of the main frame plate, and is turned clockwise simultaneously as it is moved in translation. This clockwise movement is for the purpose of increasing the feed angle to one greater than 180 degrees so that the tape may be stripped readily from the feed member at the end of the feed stroke. For instance, in an intermediate positioning of the feed mechanism during the forward stroke thereof, the feed member will have a position as shown in full lines in Figure 6. In more advanced stages of the forward stroke the feed member will be more inclined clockwise, reaching finally the position shown in dash-dot lines in Figure 6.

During the forward stroke of the feed mechanism the right arms 58 and 61 of the feed member 53 and lever 62 must clear the upper block 31, and in order that they will do so the block 31 is provided with a recess **31*a* along its lower right hand side and the right arm of the feed member is terminated just above its pivot axis 59 as shown in Figures 2 and 5. Also, in order that the arm 61 will be wholly within this recess and out of the path of the lower die plate 38 when the die unit is closed, the lever 62 is turned clockwise during the latter part of the feed stroke. This turning is effected by the spring 75 under the controlling action of the cam 77, the forward portion 77*a* of this cam—which is the portion engaged by the pin 76** during this latter portion of the feed stroke—being inclined downwardly for this purpose.

Once the tape is applied to the surface 54 of the feed member, it adheres thereto strongly enough to overcome the resisting feed force supplied by the adherence of the tape to the roll even at feed angles which are substantially greater than 180 degrees. For instance, in the position of the feed member indicated by full lines in Figure 6, approximately two thirds of a normal length of tape has been fed out into the die unit and the feed angle has already been increased to slightly more than 180 degrees. In the continuing portion of the feed stroke this feed angle continues to increase but the tape yet adheres to the feed member and is pulled positively past the punch 36. The advantage in so increasing the feed angle to well past 180 degrees during the effective portion of the feed stroke is that the tape can be stripped readily from the feed member and the feed of the tape be terminated positively simply by increasing the resisting feed force of the tape.

For so increasing the resisting feed force of the tape, and for supporting the free end of the tape during the return stroke of the feed member, there is provided a vertically movable holding member 85 below the platform 55. The holding member is slidably mounted on a bracket 86 secured to the main side frame plate 29 and is located just behind the initial or start position of the feed member as shown in Figure 2. This holding member is controlled to snap upwardly against the adhesive side of the tape, for clamping the tape to the platform, when a predetermined length of the tape—say a $\frac{9}{16}''$ length—is fed into the die unit. Since the feed angle is substantially greater than 180 degrees before the end of the feed stroke, as before explained, the tape is stripped from the feed member in response to the final forward movement of the feed member following the clamping of the tape. During this final forward movement of the feed member and during the whole return stroke thereof, the holding member remains in its upward or effective position. The holding member is however retracted downwardly at the start of the next feed stroke and is held so retracted until another predetermined length of tape is pulled into the die unit. A suitable means for so controlling the holding member is now described.

Behind the holding member and at the lower end thereof, there is a horizontal lever 88 the rearward end of which is pivoted at 89 to the main side frame plate and the forward end of which engages an aperture 90 provided in the holding member (see Figure 5). This lever is biased upwardly by a tension spring 91 as shown in Figure 6, and by this spring the holding member is urged upwardly towards the platform 55. For actuating the lever 88 downwardly there is a pin 92 on the link 70 and a cooperating cam 93 on the lever. This cam is made of a spring material such as spring steel and is held by screws to a lug 95 turned over to the right from the lever 88. The cam extends rearwardly and downwardly from the lug 95 and contacts the top edge of the lever 88 at **88*a*; also the cam has a side portion 93*a* which extends to the left of the lever 88 to be in line, forwardly and rearwardly of the machine, with the pin 92** as shown in Figure 3.

In the initial position of the feed mechanism the pin 92 lies behind and slightly above the rearward portion of the cam 93 as shown in Figure 2. In the initial operation of the feed mechanism, however, the pin is moved forwardly by the link 70 against the top side of the cam; but no movement is yet imparted to the feed member in view of the link 70 having a lost-motion connection to the bolt 72 afforded by a slot 98 in the link 70 through which the bolt passes. In the next continuing portion of the stroke the pin moves along the cam to retract the holding member 85 from the platform 55. The feed member is put in motion during this portion of the stroke but no actual feeding of the tape is yet produced since the initial movement of the feed member is one of rotation as above explained. Thus the tape is supported by the feed member as the holding member is retracted, with the result that the holding member is disengaged from the tape. In the further forward stroke of the feed mechanism, the pin 92 rides off the cam whereupon the holding member is snapped upwardly by the spring 91. In the final portion of the feed stroke the pin 92 moves onwardly ahead of the cam, but in the final portion of the return stroke the pin moves back underneath the cam, springing the cam upwardly and finally moving therebehind, the cam snapping downwardly by its own resilience when the pin clears the same.

During approximately the first half of each feed stroke the lower die plate 38 is raised only slightly by the cam 41, but by this slight upward movement the sheet 20 is clamped by the spring 45 to the lower die plate. Also, during approximately the first half of the feed stroke the feed member is moved forwardly in a downwardly inclined direction as aforementioned. In the remaining portion of the feed stroke, the lower die plate is raised at a relatively fast rate and the feed member is moved forwardly and upwardly ahead of the die plate by the clockwise rotation of the lever 62 controlled by the pin 76 now sliding down the portion 77a of the cam 77. As aforementioned, during this remaining portion of the feed stroke, the holding member 85 is released and the tape is stripped free from the feed member. In the final stage of the forward stroke, the feed member moves ahead of the die unit, and the lower die plate comes to bear against the stripper spring 47. As this occurs the back edge of the lower die plate engages in scissors fashion a shear blade 99 which depends down from the back side of the block 31, it being held to this block by screws as shown. By this engagement the tape which has been fed into the die unit is severed from the tape supply, and by the final closing movement of the die unit the length of tape so cut off is applied to the sheet 20 and the sheet and tape are punched.

During the initial portion of the return stroke of the feed mechanism, the die plate 38 is lowered and the spring 47 moves down to strip the sheet from the punch. Then in the continuing return stroke the feed member is moved in a rearward downward direction until the die plate 38 reaches nearly its lowermost position, these movements being just the reverse which occur during the last half of the forward stroke. Also, during this first half of the return stroke the feed member is being turned in a reverse or counterclockwise direction by a torsional spring 101 acting between it and the lever 62 as shown in Figure 3, the rotational movement thereof being controlled by contact of the left arm 57 of the feed member with the pin 81. The spring 101 reaches a neutral unbiased condition when the feed member is returned counterclockwise to a position just slightly past one at right angles to the arms 60 and 61 of the lever 62; thus, in the final portion of the return stroke the feed member breaks contact with the pin 81 and the feed member remains approximately in that relative position to the lever 62.

The feed member reaches its lowermost position during the intermediate portion of the return stroke when the pin 76 is at the top of the cam 77. In order that the feed member will be kept at this lowermost level during the remaining portion of the return stroke there is provided the aforementioned spring 78. This is a horizontal spring overlying the back portion of the cam 77—i. e., the recess 79—the spring being held by screws 103 to a standard 104 of the main side frame plate at the back of the recess 79 and the front portion of the spring being biased downwardly against the peak of the cam 77. In the final portion of the return stroke the pin 76 rides back on the spring 78, holding the lever 62 counterclockwise against the force of spring 75 and the feed member at a lowermost level just slightly above the lower die plate 38. The reason for keeping the feed member at such lower level during its final return movement is so that the feed member will clear well below the tape underlying the platform 55. At the final rearward return of the feed member the same is righted vertically by abutment of the back edge thereof with the holding member 85, and the feed member is snapped upwardly against the tape by the spring 75 in view of the pin 76 riding off the spring 78 through a slot 105 thereof shown in Figure 3. To assure even contact of the surface 54 of the feed member with the adhesive side of the tape, the bottom face of the platform 55 is provided with a thin layer of a resilient material such as live rubber.

It will be noted that during the forward stroke of the feed mechanism the pin 76 rides up the back side of the cam 77 and cams the spring 78 upwardly out of its path as it rides over the peak of the cam, the spring 78 then snapping downwardly against the cam so that the pin 76 will ride onto the spring during the return stroke of the feed mechanism.

Preferably, the blade 99 is extended down so that the mid point of the lower inclined cutting edge thereof will be at the level of the bottom face of the platform 55. The blade may suitably have a bevel of $\frac{1}{16}$ inch over a width of ½ inch, in which case it will project approximately $\frac{1}{32}$ inch below the platform. The blade does however not interfere with the forward movement of the feed member since it is moved initially in a downwardly inclined direction.

In Figures 7 and 8 I show a second embodiment of tape feeding mechanism applied to a reenforcing and punching machine of the same character as is above described, parts which are substantially identical to corresponding parts of the machine above described being given the same reference characters. This second machine has the main side frame plate 29 provided with the upper and lower blocks 31 and 32 and with the slit 30 intervening these blocks; also, it has the right side frame plate 34. At the back of the upper block 31 there is the blade 99, and at the bottom of the block there is the punch 36. Vertically slidable in the lower block 32 is the tube 37 carrying the lower die plate 38. Behind the blade 99 is a platform 110 corresponding to the platform 55 but being slightly different in that it has a concave or downwardly curved bottom face along its forward portion as appears in Figure 7. At the upper rearward portion of the main side frame plate there is the cam 77 and spring 78 substantially as above described.

In this embodiment there is a feed member 112 having a convex tape-contacting surface adapted to conform to the concave bottom face of the platform 110. Preferably, this feed member is provided in the form of a roller, as shown. The feed member has trunnions 113 at the ends which pivotally engage the forwardly extending arms 114 and 115 of a lever 116 corresponding to the lever 62 of the first machine. This lever straddles the main side frame plate and has the arms thereof interconnected by a cross arm 117 which overlies this main frame plate. The lever is carried by the lever 63 for reciprocative front and back movement, it being pivoted thereto at 69. The lever 116 is biased clockwise by the tension spring 75 and has a pin 76 in a left rearwardly extending arm thereof which coacts with the cam 77 and spring 78.

Behind the feed member 112 there is the holding member 85 supported and operated as in the first machine. Pivotally supported by the main frame plate at the rearward portion thereof is the tape roll 50 fractionally shown. The tape from this roll is pulled therefrom between the holding member 85 and the platform 110, with the adhesive side facing downwardly, as is now described.

In the initial position of the feed member 112 the same is urged upwardly against the concave bottom face of the platform 110 with the tape being interposed between it and the platform and the adhesive side of the tape being pressed against a front downwardly curved surface area of the feed member. Thus, at the start there is obtained the desired condition of having the tape contact the feed member at feed angles less than 180 degrees. In the initial actuation of the feed mechanism the holding member is retracted and the lever 116 is moved forwardly by the lever 63 and counterclockwise about the pivots 69 by engagement of the pin 76 with the cam 77, the feed member being thus moved in a forward-downward direction. Now, however, the feed member is held fixed against pivotal movement relative to the lever 116 by engagement of an upright arm 119 at the left side of the feed member with a latch spring 120 held by screws 121 to the lever 116. Adherence of the tape to the feed member is thus maintained, and as the feed member is moved forwardly the tape is pulled into the die unit. When the feed member nears the lower die plate 38, it takes a forward upward path, the same as in the first machine, with the lower die member being raised just behind the feed member. When a predetermined length of tape is fed out, a forwardly extending lug 122 of the latch spring 120 engages a laterally extending arm 123 held by screws 124 to the front side of the main frame plate, and the spring is cammed leftwardly out from engagement with the arm 119. Thus, the feed member is released from its pivotally latched condition and with continued forward movement in translation, it is turned clockwise by the resisting feed force of the tape. This turning increases the feed angle to angles greater than 180 degrees and causes the tape to be stripped free from the feed member. Typically, the tape may engage the periphery of the feed member over an angular length thereof of approximately 50 degress; accordingly, the clockwise pivotal movement of the feed member is limited to approximately this angle by impingement of the arm 119 against the offset leftward arm 114 of the lever 116.

During the return stroke, the feed member 112 takes the same path as in the first machine, being held in lowered position by the pin 76 and spring 78 during the latter portion thereof and being finally snapped upwardly by the spring 75 against the free end portion of the next succeeding length of tape. During the latter portion of the return stroke the arm 119 is cammed counterclockwise by a stationary pin 126 on the main frame plate and is returned thus into engagement with the latch spring 120. At the end of the rearward return of the feed member the pin 76 slides off the spring 78 and the feed member is snapped upwardly into its initial position against the tape.

While I have herein particularly shown and described my invention in terms of a combined machine for dispensing and applying tape to sheets and pushing the sheets, it will be understood that this machine is illustrative as well of useful subcombinations thereof, this being particularly true as to the tape-feeding mechanism which, it will be understood, may be used singly, or in combination with a tape severing means as illustrated for dispensing separate predetermined lengths of tape, or in combination with other mechanisms for other purposes. Moreover, it will be understood that the two feeding mechanisms herein particularly shown and described are illustrative and not limitative of the methods of feeding tape according to my invention, for it is obvious from the foregoing description that the tape may be fed according to my invention by other means. These and other changes and modifications may be made in the embodiments herein particularly shown and described without departing from the scope of my invention, which I endeavor to express according to the following claims.

I claim:

1. The method of pulling a length of tape against a resisting force, which comprises holding the tape through adhesive contact of a rigid surface therewith, pulling the tape by moving said surface in a direction opposite to that of said force with the surface being at substantially 180 degrees or less from the length of tape extending from the surface, and releasing the tape from said surface by moving the surface further in said direction with the surface being at substantially more than 180 degrees from the extending length of tape.

2. The method of pulling a length of a non-drying adhesive tape against a resisting force, which comprises applying a substantially rigid surface to the adhesive side of the tape, moving said surface in a direction opposite to that of said force with the adhesive side of the tape which is in contact with said surface being at 180 degrees or less from the adhesive side of the length of tape extending from the surface whereby adherence of the tape to said surface is maintained and the tape is pulled against said resisting force, and further moving said surface in said direction with the adhesive side of the tape in contact with the surface being at substantially more than 180 degrees from the adhesive side of the extending length of tape whereby to strip the tape from said surface.

3. The method of feeding a non-drying adhesive tape from a supply roll, which comprises applying a substantially rigid surface to the adhesive side of an end portion of the tape, imparting relative movement between said surface and roll with the surface being directed so that the adhesive side of the portion of tape adhering thereto is at substantially 180 degrees or less from the adhesive side of the length of tape extending from the surface, and imparting further movement between said surface and roll with the surface being directed so that the adhesive side of said portion of the tape is at more than 180 degrees from the adhesive side of the extending length of tape whereby to release the tape from the surface.

4. The method of feeding a non-drying adhesive tape from a source against a resisting force, which comprises applying a flat surface to the adhesive side of an end portion of the tape, moving said surface from said source while holding the surface inclined towards the adhesive side of the length of tape extending therefrom, and moving said surface further from said source while holding the surface inclined in a reverse direction to said extending length of tape.

5. The method of feeding a length of non-drying adhesive tape from a supply roll, which comprises applying a convex surface to the adhesive side of an end portion of the tape, imparting relative movement between the surface and roll for pulling the tape from the roll, and imparting relative movement in both translation and rotation between the surface and roll whereby to strip the tape from the surface.

6. The method of feeding a length of non-drying adhesive tape from a supply roll, which comprises applying a convex surface to the adhesive side of an end portion of the tape, moving said surface in translation from said roll while holding the same from substantial rotation relative to its path of travel, and moving said surface further in translation from said roll while supporting the surface for free pivotal movement.

7. The method of dispensing a length of non-drying adhesive tape against a resisting force, which comprises exerting a pulling force on the tape through adhesive contact of the tape with a moving surface, and holding said tape stationary while breaking said contact.

8. The method of feeding a length of non-drying adhesive tape from a supply roll, which comprises gripping the tape back from the free end thereof and holding the tape stationary in a given position, applying a surface to the adhesive side of the free end portion of the tape, releasing the grip on the tape and moving said surface to pull the tape from the roll, and gripping the tape again while further moving said surface to break the adhesive contact of the surface with the tape.

9. Apparatus for dispensing tape from a supply roll against a resisting force comprising a feed member having a surface for releasably holding to the tape by adhesive contact therewith; and a mechanism progressively actuatable through first and second stages of operation for imparting relative movement between said feed member and roll, said mechanism including means effective during said first stage of operation for directing the feed member so that the surface thereof in contact with the tape is at substantially 180 degrees or less from the adhesive side of the tape extending from the feed member, and including means effective during said second stage of operation for turning the feed member so that the contacting surface thereof is at substantially more than 180 degrees from the adhesive side of the extending tape.

10. Apparatus for feeding non-drying adhesive tape from a supply roll, comprising a feed member having a surface for releasably holding to the tape by adhesive contact therewith; and a mechanism actuatable for imparting movement between said feed member and roll to pull a length of tape from the roll, said mechanism including means effective during the final portion of the feed of said tape length for moving said feed member so that said surface is at more than 180 degrees from the adhesive side of the extending tape and is moved in the direction of feed of the tape whereby to cause the tape to be stripped free from the feed member.

11. Apparatus for feeding successive lengths of non-drying adhesive tape from a tape roll, comprising a feed member having a surface for releasably holding to the tape by adhesive contact therewith; means for reciprocating said feed member for pulling successive lengths of tape from the roll; means for breaking contact of the tape with the feed member at the completion of each forward stroke of said reciprocable means, including means for turning the feed member so that the adhesive side of the tape contacting the same is at more than 180 degrees from that of the tape extending from the feed member; and means for returning the feed member into contact with a next succeeding length of tape upon completion of each return stroke of said reciprocable means.

12. A mechanism for feeding lengths of non-drying adhesive tape from a tape roll, comprising means for contacting the adhesive side of an end portion of the tape and to which the tape adheres; means for moving said contacting means for pulling a length of tape from the roll; and means for breaking contact of said feed member with the tape comprising means for holding the tape stationary at the end of feed of each length thereof.

13. A mechanism for feeding non-drying adhesive tape from a tape roll, comprising a feed member having a convex surface for contacting the adhesive side of the tape; means pivotally supporting said feed member; means for moving said supporting means in translation relative to said roll through a predetermined distance of travel; means effective during a first portion of travel of said supporting means for holding said feed member restrained from pivotal movement relative to said supporting means; and means effective during a final portion of travel of said supporting means for releasing said holding means.

14. In a machine for pulling tape from a supply roll against a resisting force: the combination of a tape feed member having a surface for holding to the tape by adhesive contact therewith; a member carrying said feed member and operable to impart a movement in translation to the feed member, said feed member being pivotally connected to said carrying member on an axis substantially parallel to and spaced from said surface whereby with initial translational movement of the carrying member the feed member is turned by said resisting force into an angular position wherein the feed angle between said surface and the length of tape extending therefrom is less than 180 degrees.

15. In a machine for pulling tape from a supply roll against a resisting force: the combination of a tape feed member having a convex surface for holding to the tape by adhesive contact therewith; a member carrying said feed member and operable to impart a translational tape-feeding movement thereto, said feed member being pivotally connected to said carrying member on an axis substantially parallel to said surface and spaced from the unexposed side of the surface; means for pivotally latching said feed member to said carrying member; and means operative in the final portion of the feed stroke of the feed member for releasing said latching means whereby said feed member is turned in said final portion by resisting force of the tape to angular positions wherein portions of the contacting surface thereof are at substantially more than 180 degrees from the tape extending therefrom.

16. In a machine of the character described: the combination of a die mechanism comprising closeable die members; and a tape-feeding mechanism operatively coupled with said die mechanism and comprising a tape-holding member moved into said die mechanism upon actuation of said feeding mechanism for pulling the tape between the die members.

17. In a machine of the character described including a supply roll of non-drying adhesive tape: the combination of a die mechanism comprising closeable die members; a tape feeding member adapted to take hold of the tape by adhesive contact therewith and pull the tape into said die mechanism; and means coupling said feed member with said die mechanism and actuatable in one operation for moving said feed member through said die mechanism and closing said die members in the sequence here named.

18. In a machine of the character described including a supply roll of non-drying adhesive tape: the combination of a die mechanism comprising a pair of closeable die members; a tape feed member having a surface for holding to the tape by adhesive contact therewith; a support member for said feed chamber movable into and out of said die mechanism in straddling relation with one of the die members thereof; and means coupling said support member with said die mechanism for moving said surface of the feed member into one side of said die mechanism and out through the other side thereof as the die mechanism is closed and for returning said surface of the feed member as the die mechanism is opened.

19. In a machine for dispensing tape from a supply roll: the combination of a tape feed member having a surface for releasably holding to the tape by adhesive contact therewith; reciprocating means for said feed member actuable in one direction to pull a length of tape from said roll and then release the tape from the feed member and in the other direction to return the feed member for a succeeding operation; a member for backing the non-adhesive side of the tape; and means effective upon return of said feed member for moving the same against said backing member and into contact with the adhesive side of the tape.

20. In a machine for dispensing tape from a supply roll: the combination of a feed member having a surface for holding to the tape by adhesive contact therewith; means actuatable for pulling a length of tape by said feed member and then turning and further moving the feed member to release the tape therefrom; and means operatively coupled to said reciprocating means and operated upon a predetermined length of tape being dispensed by said feed member for severing said length from the supply roll.

21. In a machine for dispensing tape from a supply roll: the combination of a feed member having a surface for holding to the tape by adhesive contact therewith; means actuatable for pulling a length of tape by said feed member and then turning and further moving the feed member to release the tape therefrom; and means controlled by said actuating means and operated following the release of the tape from said feed member for severing said tape length from the tape supply.

22. In a machine for dispensing non-drying adhesive tape from a supply roll: the combination of means for releasably holding a free end portion of the tape; a tape feed member adapted to take hold of the tape by adhesive contact therewith, said feed member having an initial position wherein the same contacts the adhesive side of the tape adjacent said holding means; and means actuatable for releasing said holding means and thereafter moving said feed member to pull a length of tape from said supply roll.

23. The combination set forth in claim 22, further including means effective upon actuation of said actuatable means during final portion of the feed stroke thereof for restoring said holding means to effective condition and releasing the feed member from the tape.

24. The combination set forth in claim 22, further including means effective upon actuation of said actuatable means through the final portion of the feed stroke thereof for restoring said holding means to effective condition and severing the tape ahead of said holding means in the sequence here named.

25. In a machine for dispensing non-drying adhesive tape from a supply roll: the combination of a tape feed member having a surface for holding to the tape by adhesive contact therewith; a member for backing the non-adhesive side of a free end portion of the tape; a tape holding member for contacting the adhesive side of the tape and pressing the tape against said backing member; means for pressing said feed member against said backing member and into contact with the adhesive side of a free end portion of the tape adjacent said holding member; and means actuatable to withdraw said holding member from contact with said tape and thereafter to move said feed member to pull the tape from said supply roll.

26. In a machine of the character described including a supply roll of non-drying adhesive tape: the combination of a tape shearing die mechanism comprising a pair of closeable die members; a feed member adapted for releasably holding to the tape by adhesive contact therewith and pulling the tape between said die members; reciprocable actuating means effective on the forward stroke thereof for moving said feed member into the die mechanism and closing the latter in the sequence named, and effective on the return stroke for opening said die mechanism and returning said feed member; a member fixedly secured to one of said die members for backing the non-adhesive side of the tape fed into said die mechanism; and a holding member associated with said backing member for holding the free end portion of the tape in relation to said one die member during the return of said feed member.

27. In a machine for dispensing non-drying adhesive tape from a supply roll: the combination of a member backing the non-adhesive side of a free end portion of the tape; a feed member having an initial position wherein it bears against said backing member and into contact with the adhesive side of said free end portion of the tape, said member taking hold of the tape by adhesive contact therewith; means for reciprocating said feed member in directions transverse to said backing member; means effective during final portion of each return stroke of said reciprocating means for spacing said feed member from said face of the backing member; and means effective at the end of each return stroke of the reciprocating means for moving the feed member towards said backing member and into contact with the adhesive side of the tape.

28. In a machine of the character described including a supply roll of non-drying adhesive tape: the combination of a die mechanism comprising a pair of closeable die members; a member held to one of said die members adjacent said die mechanism for backing the non-adhesive side of tape from said supply roll; a feed member having an initial position wherein it bears against said backing member and into contact with the adhesive side of the tape, said feed member being adapted to take hold of the tape by adhesive contact therewith; means for moving said feed member through said die mechanism and concurrently closing the die mechanism, and for opening the die mechanism and concurrently returning the feed member to initial position, said die mechanism for feed member being timed to cause the die mechanism to be substantially open when the feed member reaches an intermediate position in its return movement; means effective during the final return movement of the feed member for directing it in a path adjacent the other of said die members and in laterally spaced relation to said backing member; and means effective at the end of the return stroke of said feed member for moving the feed member towards said backing member and into contact with the adhesive side of the tape.

29. In a machine of the character described including a supply roll of non-drying adhesive tape: the combination of a die mechanism comprising a pair of closeable die members; a member held substantially in parallel relation to the face of one of said die members at the side of said die mechanism for backing the non-adhesive side of tape from said roll; a shearing blade at said side of the die mechanism for severing the tape when the die mechanism is closed; a tape feed member having an initial position wherein it bears against said backing member and into contact with the adhesive side of the tape, said feed member being adapted to take hold of the tape by adhesive contact therewith; and means for reciprocating said feed member in translation through said die mechanism and concurrently closing the die mechanism during the final portion of the forward stroke of the feed member and opening the die mechanism during the initial portion of the return stroke thereof, including means effective during the initial portion of the forward stroke of the feed member for directing the feed member angularly towards the other of said die members, and means effective during the final portion of the return stroke of the feed member for directing the feed member in a path adjacent said other die member and in spaced relation to said backing member.

30. The method of feeding a length of pressure-sensitive adhesive tape from a source against a resisting feed force, which comprises applying a rigid surface to the adhesive side of the tape, moving said surface in a direction opposed to said force and simultaneously inclining the surface towards the adhesive side of the tape extending therefrom, and further moving said surface in a direction opposed to said force while simultaneously inclining said surface in a reverse direction.

31. In a machine of the character described including a supply roll of adhesive tape: the combination of a die mechanism including closeable die members; means for releasably holding to a free end portion of said tape; and means coupled to said holding means and said die mechanism for moving the holding means to pull a length of tape between said die members, releasing the holding means from the tape and closing said die members in the sequence here named.

32. In a machine for applying a pressure-sensitive adhesive tape to objects, including a pair of closeable die members: the combination of a mechanism for feeding tape between said die members including a member for releasably holding to the free end portion of the tape by adhesive contact therewith and moved between said die members upon actuation of said feed mechanism; and means associated with said feed mechanism for releasing said holding member from said tape and moving the holding member from the space between the die members in the final portion of an actuation of said feed mechanism.

33. In a machine for dispensing a length of pressure-sensitive adhesive tape from a supply roll: the combination of a mechanism for feeding tape from said roll including a member for holding the free end portion of the tape by adhesive contact therewith and moving said free end portion into a predetermined position; and means for releasing said holding member from said tape and severing the tape in the sequence here named.

34. A mechanism for feeding successive lengths of pressure-sensitive adhesive tape from a supply roll including a member for releasably holding to the free end portion of the tape by adhesive contact therewith; a stationary member backing the non-adhesive side of the tape contacted by said holding member; reciprocative means for advancing said holding member transversely to said backing member and returning the holding member to the latter; means operatively coupled to said reciprocative means for releasing said holding member from the tape in the final portion of the advance stroke thereof; and means associated with said backing member for retaining the tape adjacent thereto during the return stroke of the holding member.

35. In a machine for applying adhesive tape to sheets: the combination of a closeable die mechanism into which said sheets are placed; means for feeding adhesive tape into said die mechanism and across a portion of said sheet; and means associated with said die mechanism and effective upon initial closing movement thereof and until the same is restored to a substantially open condition for retaining said sheets in a predetermined position with respect to said die mechanism.

36. In a machine for applying adhesive tape to sheets: the combination of a die mechanism including closeable die members between which said sheets are placed and said tape is fed; and a member bridging substantially the space between said die members when the die mechanism is open and yieldable to closing of said die members for holding said sheets clamped to one of said die members as the die mechanism is closed.

37. The method of pulling a length of pressure-sensitive tape against a resisting force, which comprises applying a surface to the adhesive side of a leading portion of the tape, then turning said surface to an angle less than 180 degrees from the length of tape extending therefrom without exerting any substantial pulling force on the tape, and thereafter moving said surface in a direction opposite to that of said force while maintaining the surface at less than 180 degrees from the tape under tension extending therefrom.

38. The method of pulling a length of pressure-sensitive tape from a source against a resisting force by a single feed member having a convex surface, which comprises initially applying the adhesive side of a leading portion of the tape to said surface so that at least portions of said surface in contact with the tape are at less than 180 degrees from the tape extending from said surface before the surface is moved to exert any substantial pulling force on the tape, and moving said surface in a direction opposite to that of said force while maintaining from the start said surface portions at less than 180 degrees from the tape under tension extending therefrom to said source.

39. A mechanism for pulling a length of pressure-sensitive tape from a source against a resisting force comprising a feed member having a surface for releasably holding to the tape by adhesive contact therewith, and operable means coupled to said feed member and effective upon progressive actuation thereof to turn the feed member substantially about its trailing edge, until said surface is less than 180 degrees from the tape extending therefrom, and thereupon to move the feed member in a direction opposed to that of said force while maintaining said surface of the feed member at less than 180 degrees from the tape under tension extending therefrom to said source.

40. In a machine for pulling lengths of pressure-sensitive tape from a supply roll: the combination of a member backing the non-adhesive side of a free end portion of the tape; a feed member having an initial position wherein it bears against the adhesive side of the free end portion of the tape backed by said backing member; a reciprocable mechanism for imparting reciprocative movement to said feed member in directions transverse to said backing member, said mechanism comprising a reciprocable support member and a lever pivoted to said support member and pivotally carrying said feed member, guide means controlling said lever to space said feed member away from said backing member during the final portion of the return stroke of said mechanism and to move the feed member against the tape backed by said backing member at the end of said return stroke; and means at the adhesive side of the tape backed by said backing member for holding the free tape drawn from said roll against said backing member during the return of said feed member to initial position.

41. A mechanism for pulling pressure-sensitive tape from a supply roll, comprising a feed member having a convex surface for contacting the adhesive side of the tape, means pivotally supporting said feed member, means for advancing said supporting means in translation relative to said roll, and means on said supporting means for holding said feed member from being turned by the tape relative to said supporting means during a portion of the advance movement thereof.

GEORGE H. FRITZINGER.